US010039290B2

United States Patent
Van Blokland

(10) Patent No.: US 10,039,290 B2
(45) Date of Patent: Aug. 7, 2018

(54) DEVICE FOR FOLDING AT LEAST ONE DOUGH PIECE, FOLDING SHOE FOR USE IN SUCH DEVICE AND DOUGH LINE

(71) Applicant: Radie B.V., Culemborg (NL)

(72) Inventor: Johannes Josephus Antonius Van Blokland, Laren (NL)

(73) Assignee: Radie B.V., Culemborg (NL)

( * ) Notice: Subject to any disclaimer, the term of this patent is extended or adjusted under 35 U.S.C. 154(b) by 0 days.

(21) Appl. No.: 15/260,463

(22) Filed: Sep. 9, 2016

(65) Prior Publication Data

US 2017/0071216 A1 Mar. 16, 2017

(30) Foreign Application Priority Data

Sep. 11, 2015 (EP) .................................... 15184933

(51) Int. Cl.
*A21C 9/08* (2006.01)
*A21C 3/02* (2006.01)
*A21C 9/06* (2006.01)
*A21C 11/00* (2006.01)

(52) U.S. Cl.
CPC .............. *A21C 3/022* (2013.01); *A21C 9/063* (2013.01); *A21C 9/068* (2013.01); *A21C 9/088* (2013.01); *A21C 11/00* (2013.01)

(58) Field of Classification Search
CPC .......... A21C 3/022; A21C 9/063; A21C 9/088
See application file for complete search history.

(56) References Cited

U.S. PATENT DOCUMENTS

| | | | |
|---|---|---|---|
| 2,458,338 A | 9/1943 | Buechek | |
| 3,512,990 A | 5/1970 | Slaybaugh | |
| 3,611,950 A * | 10/1971 | Battaglia | A21B 5/02 |
| | | | 99/353 |
| 4,321,858 A * | 3/1982 | Williams | A21C 9/063 |
| | | | 426/497 |
| 4,797,291 A * | 1/1989 | Pierce | A21C 9/04 |
| | | | 426/383 |
| 5,196,223 A | 3/1993 | Nakamura | |
| 7,578,232 B2 * | 8/2009 | Hayashi | A21C 3/065 |
| | | | 99/353 |

FOREIGN PATENT DOCUMENTS

| | | |
|---|---|---|
| CA | 2 700 813 A1 | 10/2011 |
| GB | 1216688 | * 12/1970 |
| TW | 201 119 582 A | 6/2011 |

* cited by examiner

*Primary Examiner* — James P Mackey
(74) *Attorney, Agent, or Firm* — Varnum, Riddering, Schmidt & Howlett, LLP

(57) ABSTRACT

Device for folding at least one dough piece, comprising at least one folding shoe, for folding a dough piece conveyed along the folding shoe about a folding line in the direction of conveyance, a support, for carrying the at least one folding shoe above a conveyor for the dough piece wherein the folding shoe is mountable to and demountable from the support by a sliding connection. The specification further relates to a folding shoe, and to a dough line.

15 Claims, 3 Drawing Sheets

DEVICE FOR FOLDING AT LEAST ONE DOUGH PIECE, FOLDING SHOE FOR USE IN SUCH DEVICE AND DOUGH LINE

TECHNICAL FIELD

The present specification relates to a device for folding dough, a folding shoe for use in such device, and a dough line comprising such device or shoe.

BACKGROUND

Devices for folding dough are known in the art. They generally comprise folding shoes supported above the conveyor, wherein the shoes are bolted, or otherwise connected to the support. The folding shoes may comprise massive parts, as for instance known from the U.S. Pat. No. 3,512,990 and U.S. Pat. No. 5,196,223 or may be formed differently, for instance by rods.

Although these systems fulfil a certain need, there are several disadvantages to the devices according to the state of the art. During use the folding shoes are constantly in contact with the dough. Inevitably, remainings of the dough stick to the shoes, which—as a result—pollute. This gives rise to the need for cleaning the device, and in particular the shoes, on a regular basis.

With the devices according to the state of the art, this is a time consuming and cumbersome activity, due to the plurality of fastening means that have to be loosened. Additionally, as it is the case in U.S. Pat. No. 5,196,223, when removing the folding shoes, their correct setting is also gone, and the device requires fine adjustment before it can be taken back in use.

SUMMARY

It is a goal of the present specification to take away the disadvantages of the prior art, or at least to provide a useful alternative to the existing devices for folding dough.

The specification thereto proposes a device for folding at least one dough piece, comprising at least one folding shoe, for folding a dough piece conveyed along the folding shoe about a folding line in the direction of conveyance, a support, for carrying the at least one folding shoe above a conveyor for the dough piece, wherein the folding shoe is mountable to and demountable from the support by a sliding connection.

By mounting and demounting the folding shoe with a sliding connection, it can be quickly taken out of the device, for cleaning and/or (re)placement properties. In particular, in a device according to the specification, the folding shoe is removable without the requirement to also remove another part or other parts.

In particular, the folding shoe is mountable to and demountable from the support by a just the sliding connection, that is, without the requirement to loosen bolts, screws, or the like up front. A snap connection may be present, in particularly when it is integrally formed with the shoe. In a preferred embodiment comprising multiple folding shoes, each folding shoe is individually mountable to and demountable from the support by the sliding connection.

Preferably, the sliding connection is formable by sliding the folding shoe in a sliding direction, wherein the sliding direction for mounting the shoe is essentially in the direction of conveyance, and the sliding direction for demounting the shoe is essentially against the direction of conveyance. This way, the risk of the shoe being unintentionally loosened by a force exerted by the dough is taken away.

It may further be advantageous when the sliding direction has a component towards the conveyor, which may be the case either for mounting or for demounting, or for both. Since the side of the shoe facing the conveyor, has only an absolute minimal distance from the conveyor if it has any distance at all, this means that the shoe is pushed against or temporarily pressed into the conveyor when being mounted or demounted. Not only does this further avoid unintended loosening of the shoe, but it also gives a user an indication that the shoe is correctly placed, when a threshold force is overcome during mounting.

In a practical embodiment, the sliding connection comprises at least one slot, provided in the folding shoe, and at least one pin, provided on the support, and in case of multiple folding shoes, the pin is formed by a rod for engaging multiple slots of folding shoes. Such rod may be provided with flanges, for defining the position of the folding shoe in a direction perpendicular to the direction of conveyance.

The shoe may further is supported by at least two engaging points, mutually spaced in the direction of conveyance. Herewith further stability is obtained.

In yet a further embodiment wherein the folding shoe is supported by at least two engaging points, the shoe is rotatable about the downstream engaging point and wherein folding shoe has play about the upstream engaging point, the play in a direction allowing the rotation. As a result, the tip of the folding shoe slides over the conveyor belt, which compensates for imperfections or fluctuations in the thickness of the belt. The device may further comprise a roller downstream each folding shoe, in particular a wheel, for fixating the dough in its folded position.

BRIEF DESCRIPTION OF THE DRAWINGS

The specification will now be elucidated into more detail with reference to the following figures. Herein.

DETAILED DESCRIPTION

Figure 1:
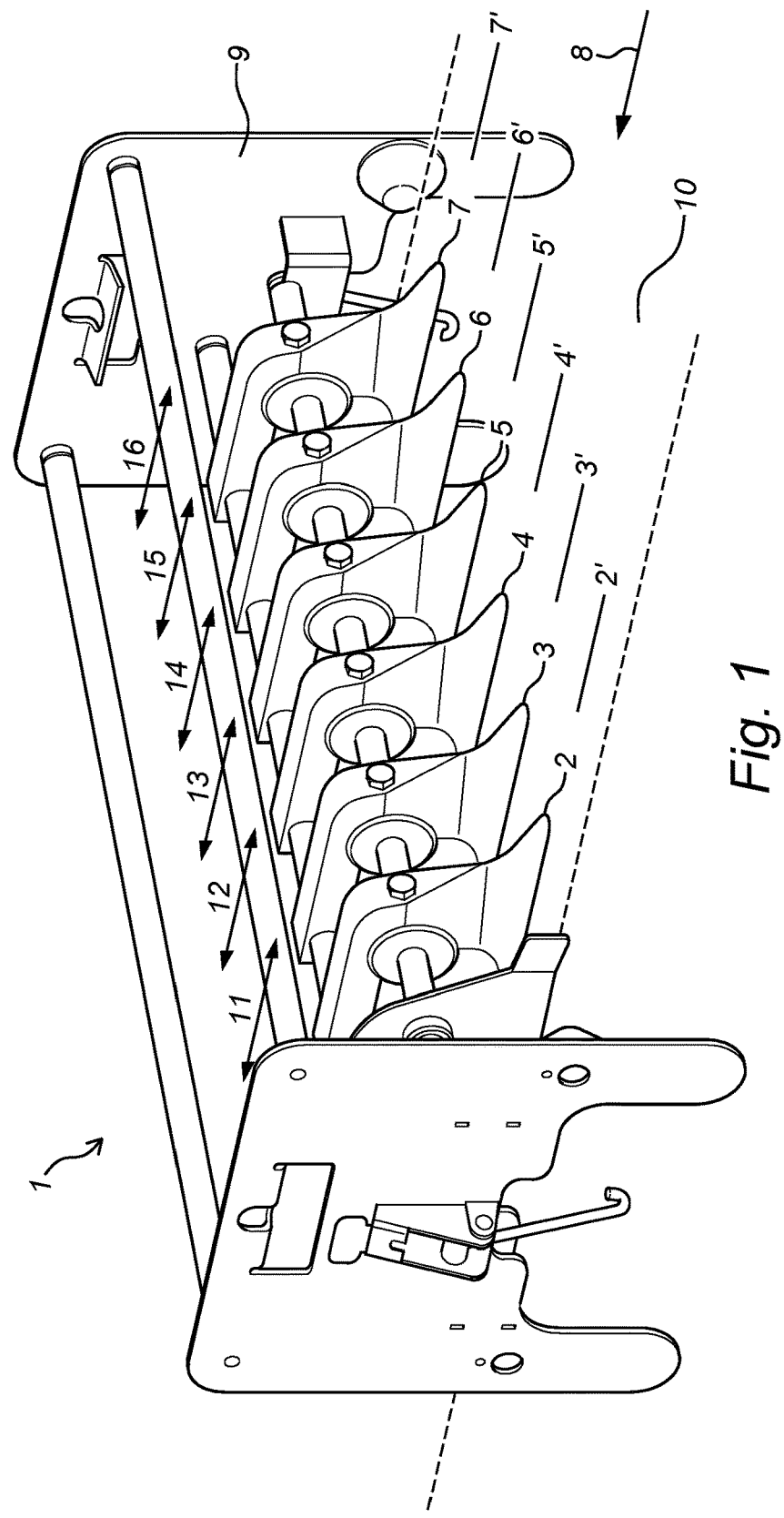
FIG. 1 shows a perspective view of a device according to the specification.

FIG. 1 shows a perspective view of a device 1 for folding at least one dough piece, comprising folding shoes 2-7, for folding a dough piece conveyed along the folding shoes 2-7 about a folding line 2'-7' in the direction 8 of conveyance, and a support 9, for carrying the folding shoes 2-7 above a conveyor 10 for the dough pieces. The conveyor 10 does not necessarily form part of the present embodiment. The folding shoes 2-7 are is mountable to and demountable from the support 9 by a sliding connection, by sliding in the direction 11-16. Mounting takes place parallel to the direction 8, demounting against it.

Each folding shoe 2-7 is individually mountable to and demountable from the support by the sliding connection.

Figure 2:
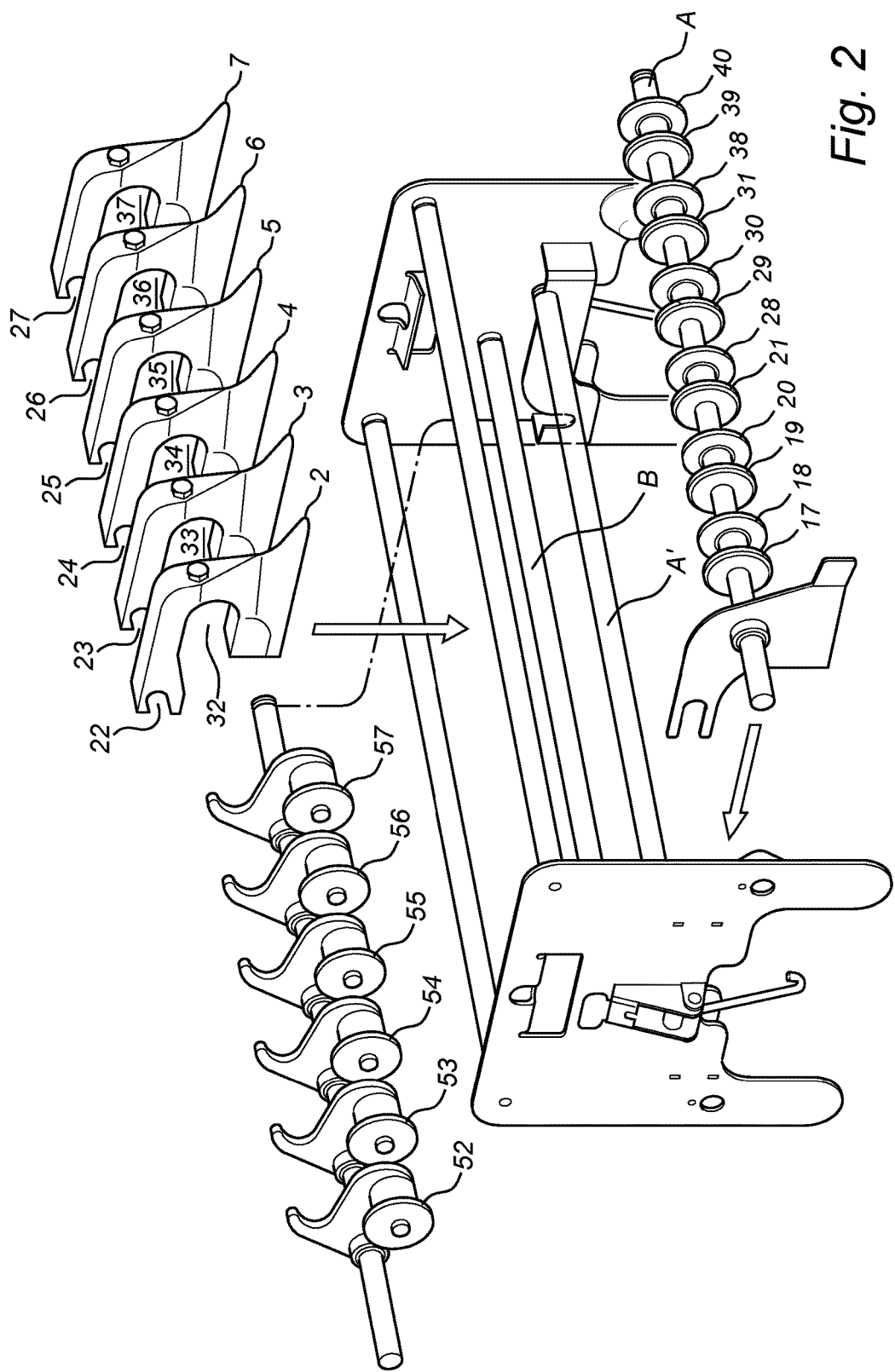
FIG. 2 shows a perspective partly exploded view of a device according to the specification.

FIG. 2 shows a perspective partly exploded view of a device 1 from FIG. 1. In the figure it is visible that there are slots 22-27 provided in the folding shoes 2-7, for engaging rod B, and further, there are slots 32-37 for engaging rod A, when it's in its normal position A'. Rod A' is provided with flanges 17-21, 28-31, 39-40, for defining the position of the folding shoes 2-7 in a direction perpendicular to the direction of conveyance 8. The figure further shows the wheels 52-57 for closing the folded dough pieces by pressing them with a predetermined height.

Figure 3:
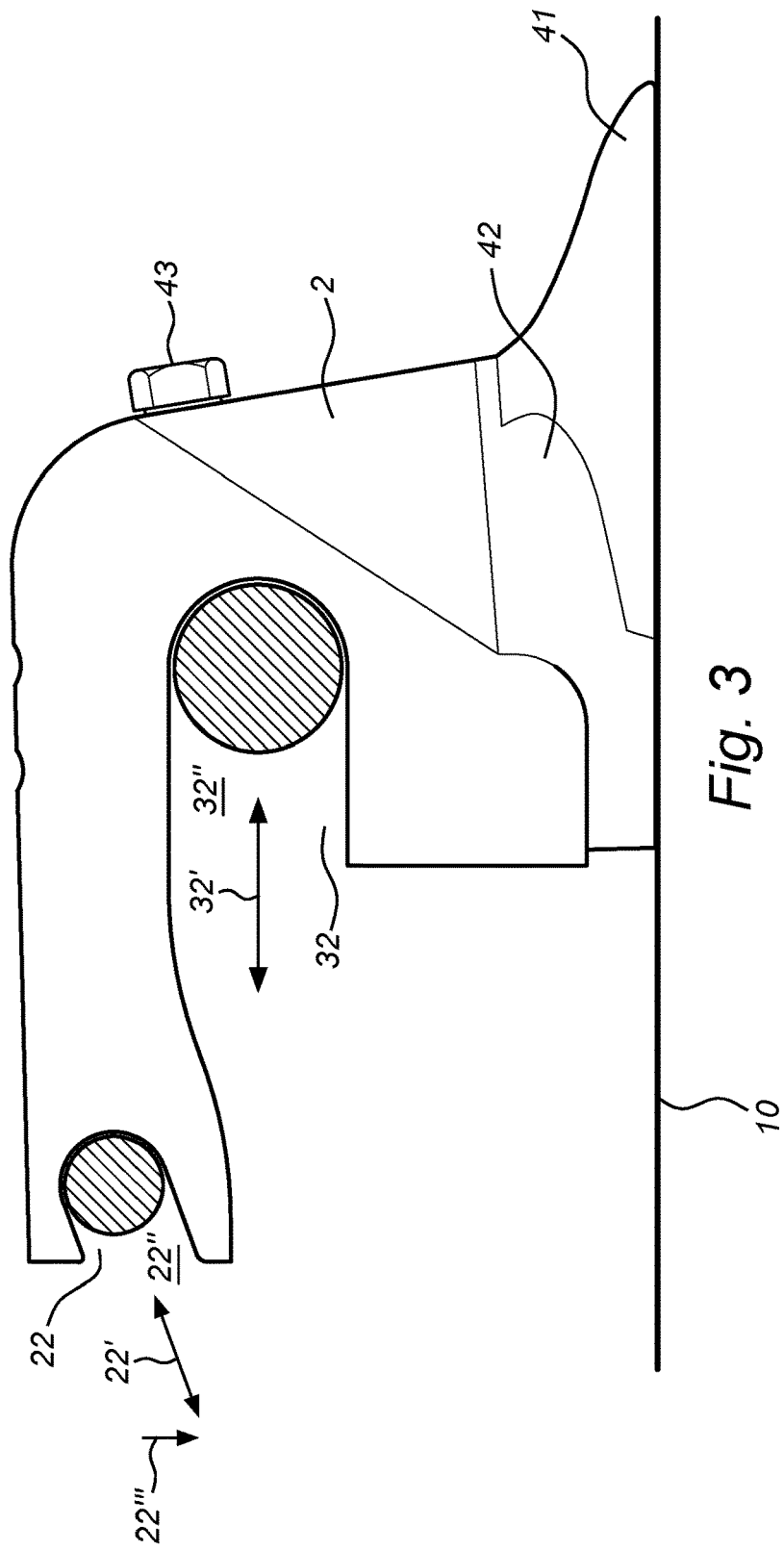
FIG. 3 shows a folding shoe according to the specification.

FIG. 3 shows a folding shoe 2 according to the specification, comprising a tip 41 for lifting the dough (not depicted but conveyable on the conveyor 10), a guidance 42 for folding the lifted dough; and two slots 22, 32, wherein the first slot 32, closest to the tip 41, extends in a direction 32' of intended dough guidance and is opened 32'' at its downstream end and the second slot 22, extends in a direction 22' of intended dough guidance, thus with a direction component 22''' toward the side where the dough passes during intended use.

The shoe is further provided with the option 43 to mount an extra weight on it, which may be advantageous when very strong dough is used.

The invention claimed is:

1. A device for folding at least one dough piece, comprising:
    at least one folding shoe, for folding a dough piece conveyed along the folding shoe about a folding line in a direction of conveyance;
    a support, for carrying the at least one folding shoe above a conveyor for the dough piece;
    wherein
    the folding shoe is mountable to and demountable from the support by only a sliding connection.

2. The device according to claim 1, comprising multiple folding shoes, wherein each folding shoe is individually mountable to and demountable from the support by the sliding connection.

3. The device according to claim 1, wherein the sliding connection is formable by sliding the folding shoe in a sliding direction, wherein the sliding direction for mounting the shoe is essentially in the direction of conveyance, and the sliding direction for demounting the shoe is essentially against the direction of conveyance.

4. The device according to claim 3, wherein the sliding direction has a component towards the conveyor.

5. The device according to claim 1, wherein the sliding connection comprises at least one slot, provided in the folding shoe, and at least one pin, provided on the support.

6. The device according to claim 5, wherein the pin is formed by a rod for engaging multiple slots of folding shoes.

7. The device according to claim 6, wherein the rod is provided with flanges, for defining the position of the folding shoe in a direction perpendicular to the direction of conveyance.

8. The device according to claim 1, wherein the shoe is provided with at least two slots, mutually spaced in the direction of conveyance, each of which arranged to receive at least part of a pin of the support.

9. The device according to claim 1, wherein the shoe is supported by at least two engaging points, mutually spaced in the direction of conveyance.

10. The device according to claim 9, wherein the folding shoe is rotatable about a downstream engaging point and wherein folding shoe has play about an upstream engaging point, the play in a direction allowing the rotation.

11. The device according to claim 1, comprising a roller—for fixating the dough in its folded position.

12. A dough line comprising a device according to claim 1.

13. A folding shoe for dough, comprising:
    a tip for lifting the dough;
    a guidance for folding the lifted dough; and
    at least two slots for engaging a support mutually spaced in a direction of intended conveyance, each of which arranged to receive at least part of a support;
    wherein the slots are opened at a side facing away from the tip.

14. The folding shoe according to claim 13, comprising two slots, wherein a first slot, closest to the tip, extends in a direction of intended dough guidance and is opened at a downstream end and a second slot, extends in a direction of intended dough guidance with a direction component toward a side where the dough passes during intended use.

15. A dough line comprising the folding shoe according to claim 13.

* * * * *